US008965554B2

(12) United States Patent
Suzuki et al.

(10) Patent No.: US 8,965,554 B2
(45) Date of Patent: Feb. 24, 2015

(54) PRESS-FORMING DEVICE, PRESS-FORMING METHOD, COMPUTER PROGRAM/SOFTWARE ARRANGEMENT AND STORAGE MEDIUM

(75) Inventors: Noriyuki Suzuki, Chiba (JP); Akihiro Uenishi, Tokyo (JP); Yukihisa Kuriyama, Tokyo (JP); Toshiyuki Niwa, Tokyo (JP); Takuya Kuwayama, Tokyo (JP); Mitsuharu Yamagata, Tokyo (JP)

(73) Assignees: Nippon Steel & Sumitomo Metal Coporation, Tokyo (JP); Arcelormittal France, Saint-Denis (FR)

( * ) Notice: Subject to any disclaimer, the term of this patent is extended or adjusted under 35 U.S.C. 154(b) by 1014 days.

(21) Appl. No.: 13/050,691

(22) Filed: Mar. 17, 2011

(65) Prior Publication Data
US 2011/0166685 A1 Jul. 7, 2011

Related U.S. Application Data

(62) Division of application No. 10/579,544, filed as application No. PCT/JP2004/016651 on Nov. 10, 2004, now Pat. No. 8,020,418.

(30) Foreign Application Priority Data

Nov. 11, 2003 (JP) .................... 2003-381285
Sep. 10, 2004 (JP) .................... 2004-264022

(51) Int. Cl.
*G06F 19/00* (2011.01)
*B21D 22/20* (2006.01)
(Continued)

(52) U.S. Cl.
CPC ............ *B21D 22/20* (2013.01); *B21D 24/10* (2013.01); *G05B 2219/49088* (2013.01); *G05B 2219/49097* (2013.01)
USPC ........... 700/153; 700/154; 700/155; 700/203; 700/204; 700/205

(58) Field of Classification Search
CPC ............... B21D 22/20; B21D 24/10; G05B 2219/49097; G05B 2219/49088
USPC ......... 700/145–155, 197–207; 72/14.9, 15–2, 72/16.1, 19.6, 236, 350–351
See application file for complete search history.

(56) References Cited

U.S. PATENT DOCUMENTS 3,976,981 A 8/1976 Bowden
4,592,220 A 6/1986 Martinez et al.
(Continued)

FOREIGN PATENT DOCUMENTS

EP 0675419 4/1995
JP 5285554 11/1993
(Continued)

OTHER PUBLICATIONS

English Summary of Japanese Office Action and Japanese Office Action for Application No. 2004-264022 (Trial No. Amendment 2009-15687) mailed on Apr. 12, 2011 from Japanese Patent Office.
(Continued)

*Primary Examiner* — Ramesh Patel
(74) *Attorney, Agent, or Firm* — Birch, Stewart, Kolasch & Birch, LLP (57) ABSTRACT

Exemplary embodiments of a press-forming device, press-forming method, computer program/software arrangement and storage medium can be provided. The exemplary press-forming device can include a material characteristic input configured to input material characteristics. A state variable detector can be configured to measure a state variable comprising a metal mold distortion amount. A processing condition computer arrangement can be configured to determine from a first moment to a second moment at least one particular processing condition. Further, a processing condition controller can be configured to control the at least one processing condition from processing conditions.

3 Claims, 10 Drawing Sheets

(51) Int. Cl.
*B21D 24/10* (2006.01)
*B29C 45/00* (2006.01)
*G06G 7/66* (2006.01)

(56) References Cited

U.S. PATENT DOCUMENTS

| | | | |
|---|---|---|---|
| 5,419,169 A | | 5/1995 | Kirii |
| 5,507,164 A | * | 4/1996 | Trausi et al. ............. 72/37 |
| 5,692,405 A | | 12/1997 | Kirii |
| 6,044,895 A | | 4/2000 | Kuttner et al. |
| 6,457,370 B1 | * | 10/2002 | Okano ..................... 73/816 |
| 7,044,193 B2 | * | 5/2006 | Etzelsdorfer et al. ........ 164/452 |
| 7,367,104 B2 | * | 5/2008 | Hohenbichler et al. ..... 29/527.6 |
| 7,785,098 B1 | * | 8/2010 | Appleby et al. ............ 425/470 |
| 7,886,564 B2 | * | 2/2011 | Suzuki et al. ................ 72/14.9 |
| 7,893,413 B1 | * | 2/2011 | Appleby et al. ........... 250/505.1 |
| 8,020,418 B2 | * | 9/2011 | Suzuki et al. ................ 72/16.1 |
| 8,091,395 B2 | * | 1/2012 | Suzuki et al. ................ 72/14.9 |
| 8,150,544 B2 | * | 4/2012 | Burvenich et al. ............ 700/145 |
| 8,166,791 B2 | * | 5/2012 | Baba et al. ................... 72/350 |
| 2011/0094279 A1 | * | 4/2011 | Suzuki et al. ................ 72/17.3 |

FOREIGN PATENT DOCUMENTS

| | | |
|---|---|---|
| JP | 05285700 | 11/1993 |
| JP | 06246499 | 9/1994 |
| JP | 07265957 | 10/1995 |
| JP | 7266100 | 10/1995 |
| JP | 08300048 | 11/1996 |
| JP | 10128451 | 5/1998 |
| JP | 11-197991 | 7/1999 |
| JP | 2002-263742 | 9/2002 |
| JP | 2003-048027 | 2/2003 |
| JP | 2003-053437 | 2/2003 |
| JP | 2004249365 | 9/2004 |

OTHER PUBLICATIONS

English translation of International Preliminary Examination Report for International Application No. PCT/JP2004/016651.

Kenichi Manabe et al. "Development of a combination punch speed and black-holder fuzzy control system for the deep-drawing process", Journal of Materials Processing Technology, 2002, pp. 440-445.

J. Zhao et al., "Study on intelligent control technology for the deep drawings of an axi-symmetric shell part", Journal of Materials Processing Technology, 2004, pp. 98-104.

Richard Kergen, "A Comparison of different Black-Holder Force Control Principles based on the Cup Test", IDDRG 98 Genval (Brussels, Belgium), pp. 1-9.

Richard Kergen, "A Comparison of different Black-Holder Force Control Principles based on the Cup Test", WG IDDRG 98 Eger (Hungary), pp. 1-6.

M. Traversin et al., "Finite Element Simulation of the Closed-Loop Control of the Blank-Holder Force in Deep-Drawing", 19th IDDRG Biennial Congress, Jun. 1996, pp. 10-14.

Marc Traversin et al., "Closed-Loop Control of the Blank-Holder Force in Deep-Drawing: finite-element modeling of its effects and advantages", Journal of Materials Processing Technology, 1995, pp. 306-317.

Richard Kergen et al., "Computerized Control of the Blackholder Pressure on Deep Drawing Presses" International Congress & Exposition, Feb. 1992, pp. 50-55.

"Blackholder Force Control in Deep Drawing: Application on a Critical Industrial Part" New Developments in Sheet Metal Forming May 2000, IFU-FGU-DGM Stuttgart.

Richard Kergen, "Regelbarer Niederhalter: Ein System, das eine unabhangige Regelung der Niederhalterkraft an verschiedenen Stellen des Niederhalters ermoglicht" pp. 401-416.

Instrumentation System for V-bending process using die-embedded micro-sensors 54th Lecture meeting for Technology of Plasticity, Nov. 2003.

The intelligible press processing, Japan Society for Technology of Plasticity, pp. 101-112.

Yutaka Kurata "Absorption and Shield against Electromagnetic Wave" Nikkei Technical Books Corp. Jan. 10, 1989.

Masaki Toriumi "Positioning Techniques in Semiconductor Manufacturing Equipment", 1991, pp. 24-28.

Masashi Kamiya "Characteristics of a Self-acting Step-groove Gas Bearing and Its Applications" 1987, pp. 46-52.

G.P. Carver and W.A. Collins, "Semiconductor Measurement Technology a Manual Wafer Probe Station for an Integrated Circuit Test System" National Bureau of Standards, May 1981, pp. 1-14.

Supplementary Partial European Search Report for Application No. 04818248.9.

English Summary of Japanese Office Action and Japanese Office Action for Application No. 2009-195500 mailed on Aug. 16, 2011 from Japanese Patent Office.

* cited by examiner

| | | MATERIAL CHARACTERISTIC VALUE (P) | | | | | | | | | |
|---|---|---|---|---|---|---|---|---|---|---|---|
| | | SHEET THICKNESS | YIELD STRENGTH | TENSILE STRENGTH | ELONGATION | n VALUE | r VALUE | PLASTICITY COEFFICIENT | HARDNESS | TEMPERATURE | ROUGHNESS | FRICTION COEFFICIENT | LUBRICANT FILM THICKNESS | ⋯ |
| FORMING CONDITION INITIALIZATION VALUE (C0) | FORMING SPEED | 0.2 | 0.2 | 0.3 | 0.4 | 0.5 | 0.2 | 0.3 | 0.2 | −0.1 | −0.2 | −0.5 | 0.5 | ⋱ |
| | BLANK-HOLDING FORCE | 0.4 | 0.4 | 0.6 | 0.8 | 1.0 | 0.4 | 0.6 | 0.4 | −0.2 | −0.4 | −1.0 | 1.0 | ⋱ |
| | METAL MOLD TEMPERATURE | 0.0 | 0.0 | 0.0 | 0.0 | 0.0 | 0.0 | 0.0 | 0.0 | 0.0 | 0.0 | 0.0 | 0.0 | ⋱ |
| | ⋯ | ⋱ | ⋱ | ⋱ | ⋱ | ⋱ | ⋱ | ⋱ | ⋱ | ⋱ | ⋱ | ⋱ | ⋱ | ⋱ |

FIG. 4

| | | STATE VARIABLE (S) | | | | | | | | |
|---|---|---|---|---|---|---|---|---|---|---|
| | | PUNCH REACTION | METAL MOLD TEMPERATURE | METAL MOLD DISTORTION No.1 | METAL MOLD DISTORTION No.2 | METAL MOLD DISTORTION No.3 | DISPLACEMENT No.1 | DISPLACEMENT No.2 | DISPLACEMENT No.3 | MATERIAL TEMPERATURE | ...... |
| FORMING CONDITION CORRECTION AMOUNT (C) | FORMING SPEED | −1.0 | −0.5 | −0.2 | −0.2 | −0.2 | −0.2 | −0.2 | −0.2 | −0.5 | *.* |
| | BLANK-HOLDING FORCE | −1.0 | −0.5 | −0.2 | −0.2 | −0.2 | −0.2 | −0.2 | −0.2 | −0.5 | *.* |
| | METAL MOLD TEMPERATURE | 0.0 | −1.0 | 0.0 | 0.0 | 0.0 | 0.0 | 0.0 | 0.0 | 1.0 | *.* |
| | ...... | *.* | *.* | *.* | *.* | *.* | *.* | *.* | *.* | *.* | *.* |

FIG. 5

|  | P(1) (SHEET THICKNESS /mm) | P(2) (YIELD STRENGTH /MPa) | P(3) (TENSILE STRENGTH /MPa) | P(4) (TOTAL ELONGATION /%) | P(5) (HARDNESS /Hv) |
|---|---|---|---|---|---|
| COIL TYPICAL MECHANICAL PROPERTIES | 1.175~1.225 | 145 | 285 | 43 | 145 |
| REFERENCE VALUE | 1.200 | 140 | 280 | 42 | 140 |

FIG. 6

| STANDARD PROCESSING CONDITION | VALUE |
|---|---|
| C0 (1) (FORMING SPEED) | 50mm/sec. |
| C0 (2) (BLANK-HOLDING FORCE) | 50kN |

FIG. 7

|  | P(1) (SHEET THICKNESS) | P(2) (YIELD STRENGTH) | P(3) (TENSILE STRENGTH) | P(4) (TOTAL ELONGATION) | P(5) (HARDNESS) |
|---|---|---|---|---|---|
| C0 (1) (FORMING SPEED) | 0.2 | 0.2 | 0.3 | 0.4 | 0.2 |
| C0 (2) (BLANK-HOLDING FORCE) | 0.4 | 0.4 | 0.6 | 0.8 | 0.4 |

FIG. 8

| | S(1) PUNCH REACTION 10mm | S(2) PUNCH REACTION 20mm | S(3) PUNCH REACTION 30mm | S(4) METAL MOLD TEMPERATURE (AT FORMING START) |
|---|---|---|---|---|
| REFERENCE VALUE | 20kN | 40kN | 65kN | 30°C |

FIG. 9

|  | S(1) PUNCH REACTION 10mm | S(2) PUNCH REACTION 20mm | S(3) PUNCH REACTION 30mm | S(4) METAL MOLD TEMPERATURE (AT FORMING START) |
|---|---|---|---|---|
| C(1) (FORMING SPEED) | −1.0 | −1.0 | −1.0 | −0.5 |
| C(2) (BLANK-HOLDING FORCE) | −1.0 | −1.0 | −1.0 | −0.5 |

PRESS-FORMING DEVICE, PRESS-FORMING METHOD, COMPUTER PROGRAM/SOFTWARE ARRANGEMENT AND STORAGE MEDIUM

CROSS REFERENCE TO RELATED APPLICATION(S)

This application is a divisional application of U.S. application Ser. No. 10/579,544 filed on May 11, 2006, which is a U.S. National Stage application of International Application No. PCT/JP2004/016651, filed on Nov. 10, 2004 and published on May 19, 2005 as International Publication No. WO 2005/044481 (the "International Application"), and claims priority to Japanese Patent Application No. 2003-381285 filed on Nov. 11, 2003, and Japanese Patent Application No. 2004-264022 filed on Sep. 10, 2004. The entire disclosures of these applications are incorporated by reference herein in their entireties.

FIELD OF THE INVENTION

The present invention relates to a press-forming device, a press-forming method, a computer program and a storage medium, e.g., to be used for processing irrespective of characteristic deviation of various metal materials such as iron series, nonferrous series, stacked materials and the like, or environmental fluctuations during processing.

BACKGROUND INFORMATION

Conventionally, when performing deep-drawing, bending, cutting, or the like to a metal material, using a press-forming device, it is usual to carry out actual production after determining appropriate forming conditions, namely, processing conditions such as the shape of metal molds, lubricating conditions, forming speed, blank holding force, the temperature of metal molds and work, etc. for every metal material in advance by trial production through experience, or through experiment, or by simulation or the like using a finite-element method.

Various metal materials being a raw material can be plates, pipes, bars, wires, powder or grains, and the like obtained through multiple processes of melting-smelting-casting-rolling-heat treatment-secondary processing and so on from raw material or scraps, and there inevitably exists some extent of deviation in mechanical properties in a product due to fluctuation of chemical components, or fluctuation of processing conditions such as uneven temperatures.

Accordingly, even when appropriate forming conditions are determined in advance as described above, occurrence of forming defect may arise due to differences in formability according to material positions or production lot numbers. In order to avoid this defect, an execution of quality control during material production process is performed more severely. However, such severity may lead to a material cost increase, and may not be recommendable.

Moreover, even when the mechanical characteristics of the raw material are identical, occurrence of forming defect may arise due to environmental fluctuation during processing such as temperature change of metal mold caused by continuous operation, abrasion of metal mold, fluctuation of atmospheric temperature or humidity.

As a countermeasure against these disadvantages, various inventions for a press-forming method to control processing conditions according to metal material or conditions of a metal mold have been disclosed. For example, Japanese Patent Application Laid-open No. Hei 7-266100 describes is a device to control air pressure in an air cylinder to carry out press-forming under an appropriate blank holding force. This is described as being performed by determining in advance a relation between a physical quantity such as a shape of press material and its mechanical property, chemical property, a laminate layer property of plating or the like, and surface conditions such as oil quantity or the like; and an appropriate blank holding force from which prescribed press quality is obtained; and by determining the appropriate blank holding force according to actual physical quantity from the above-described relation.

Japanese Patent Application Laid-open Nos. Hei 5-285700 and Hei 6-246499 describe a device which adjusts press conditions based on machine information and metal mold information peculiar to a press machine. Japanese Patent Application Laid-open Nos. Hei 7-265957, Hei 10-128451 and Hei 8-300048 describe various methods to adjust to prescribed bending angles in a bending process using a press brake.

Japanese Patent Application Laid-open Nos. Hei 7-266100, Hei 5-285700 and Hei 6-246499 provide descriptions which are generally aimed at controlling blank holding force based on material characteristics, information peculiar to a machine, and metal mold information. However, since lubrication characteristics, especially with metal molds, may vary from one moment to the next by the synergistic effect of the fluctuation of material characteristics and the fluctuation of machine and mold conditions, it may be difficult to estimate the force in advance.

The description of Japanese Patent Application Laid-open Nos. Hei 7-265957, Hei 10-128451 and Hei 8-300048 are generally aimed at adjusting the processing conditions according to the state of deformation during processing of the work in a bending process, but it is difficult to measure complicated three-dimensional shape on the spot in drawing or cutting. Further, since material is cramped with a metal mold during drawing or cutting, problems may exist in measuring the material shape precisely.

One of the objects of the present invention is to overcome and/or address the above-described problems, and to provide a way to perform satisfactory press-forming while compensating deviation of various material characteristics and environmental fluctuation during processing.

SUMMARY OF EXEMPLARY EMBODIMENTS OF THE INVENTION

An exemplary embodiment of press-forming device and method according to the present invention can be provided to obtain a satisfactory press molding product. For example, this can be done by grasping and computation controlling a plurality of arrangements out of a material characteristic input arrangement, a material characteristic measurement arrangement, or a state variable detector for the fluctuation of material characteristics or lubrication characteristics between a metal mold and a work (which have been previously difficult to estimate).

According to one exemplary embodiment of the press-forming device of the present invention, the press-forming device may have a punch, die and blank holder. A material can be press-formed according to a predetermined forming condition. For example, the press-forming device can include a plurality of arrangements, a material characteristic input arrangement capable of inputting at least one material characteristic out of material characteristics of sheet thickness, yield strength, 0.2% proof stress, tensile strength, elongation, n value, r value, stress-strain relation equation, hardness, temperature, surface roughness, friction coefficient, or lubricant film thickness, of the material. In addition, a material characteristic measurement arrangement can be provided for measuring at least one material characteristic out of material characteristics of sheet thickness, yield strength, 0.2% proof stress, tensile strength, elongation, n value, r value, stress-strain relation equation, hardness, temperature, surface roughness, friction coefficient, and lubricant film thickness, of the material before forming. Alternatively or in addition, a state variable detector may be provided for measuring at least one state variable out of the state variables of punch reaction, metal mold temperature, metal mold distortion amount, work piece deformation amount, or work piece temperature during forming the material.

In addition, a processing condition computer may be provided which is configured to determine at least one processing condition out of the processing conditions for forming speed, blank holding force or metal mold temperature from at least two or more pieces of information out of material characteristics inputted by the material characteristic input arrangement, material characteristics measured by a material characteristic measurement means or a material state variable during forming measured by the state variable detector. In addition, a processing condition controller may be provided which is configured to control at least one processing condition out of the process conditions including punch or die movement speed, metal mold temperature or blank holding force based on the processing condition determined by the processing condition computer.

According to one exemplary variant of the present invention, the material characteristic input arrangement can include one or more of a manual input device, a bar code reader, an IC tag reader, a flexible disc and/or a photo-magnetic disc reader.

In another exemplary embodiment of the present invention, a press-forming method can be provided which can use a press-forming device having a punch, die and blank holder, and press-forming a material according to a prescribed forming condition. For example, at least one material characteristic out of the material characteristics of sheet thickness, yield strength, 0.2% proof stress, tensile strength, elongation, n value, r value, stress-strain relation equation, hardness, temperature, surface roughness, friction coefficient, or lubricant film thickness of the material can be inputted. At least one material characteristic out of the material characteristics of sheet thickness can be measured before forming, yield strength, 0.2% proof stress, tensile strength, elongation, n value, r value, stress-strain relation equation, hardness, temperature, surface roughness, friction coefficient, or lubricant film thickness of the material before forming. At least one state variable out of the state variables can be formed of the punch reaction, metal mold temperature, metal mold distortion amount, work piece deformation amount, or work piece temperature, during forming the material.

In addition or alternatively, at least one processing condition out of the processing conditions can be determined for forming speed, blank holding force or metal mold temperature from at least two or more pieces of information out of material characteristics inputted, material characteristics measured by a material characteristic measurement step or a material state variable when the state variable is formed. At least one control condition out of the processing conditions including punch or die movement speed, metal mold temperature or blank holding force can be controlled based on the processing condition.

According to another variant of the present invention, the punch reaction maximum value can be obtained during forming into the computer for every prescribed number of times in the processing condition control process. This can be done to determine the moving average value of the punch reaction maximum value. For example, when the calculated punch reaction maximum value deviates from the prescribed value, the blank holding force can be changed.

According to yet another exemplary embodiment of the present invention, another press-forming method can be provided that may use a press-forming device having a punch, die and blank holder, and press-forming a material according to a prescribed forming condition. For example, at least one or more state variables out of the state variables may be measured for obtaining punch reaction, metal mold temperature, metal mold distortion amount, work piece deformation amount or work piece temperature, for every forming of material. At least one processing condition out of one kind or two or more kinds of processing conditions may be determined for forming speed, blank holding force, or metal mold temperature according to comparison result with the past state variables. At least one or more processing conditions out of the processing conditions including a punch or die movement speed, metal mold temperature, or blank holding force can be controlled based on the processing conditions.

In one exemplary variant of the present invention, at least one material characteristic out of the material characteristics of sheet thickness, yield strength, 0.2% proof stress, tensile strength, elongation, n value, r value, stress-strain relation equation, hardness, temperature, surface roughness, friction coefficient, or lubricant film thickness of the material may be provided. At least one processing condition out of the processing conditions can be determined for the forming speed, blank holding force, or metal mold temperature from material characteristics inputted in the material characteristic input process and a material state variable for every forming processing performed by the measurement of the state variable. The comparison result with the past state variables may be obtained as a result of comparing the difference between the past state variable and that of the present value, and the moving average value and the prescribed value within a prescribed time period or a prescribed number of times.

According to a further exemplary embodiment of the present invention, a computer program/software arrangement can be provided. For example, the computer program/software arrangement can be stored on a storage medium and/or may be accessed by a processing arrangement for performing a press-forming technique using a press-forming device having a punch, die and blank holder, and press-forming a material according to a predetermined forming condition. For example, the computer program/software arrangement can perform the procedures described above for the exemplary methods of the present invention when the computer program/software arrangement is executed by a processing arrangement. In a still further exemplary embodiment of the present invention, a storage medium (e.g., a computer readable recording medium) can be provided which may provide or store thereon a computer program product/software arrangement described above.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figure showing illustrative embodiment(s), result(s) and/or feature(s) of the exemplary embodiment(s) of the present invention, in which.

Throughout the figures, the same reference numerals and characters, unless otherwise stated, are used to denote like features, elements, components or portions of the illustrated embodiments. Moreover, while the present invention will now be described in detail with reference to the figures, it is done so in connection with the illustrative embodiments.

DETAILED DESCRIPTION OF EXEMPLARY EMBODIMENTS OF THE INVENTION

Exemplary Embodiment

Hereinafter, exemplary embodiments of a press-forming device, a press-forming method, a computer program/software arrangement, and a storage medium according to the present invention will be explained referring to the drawings.

Figure 1:
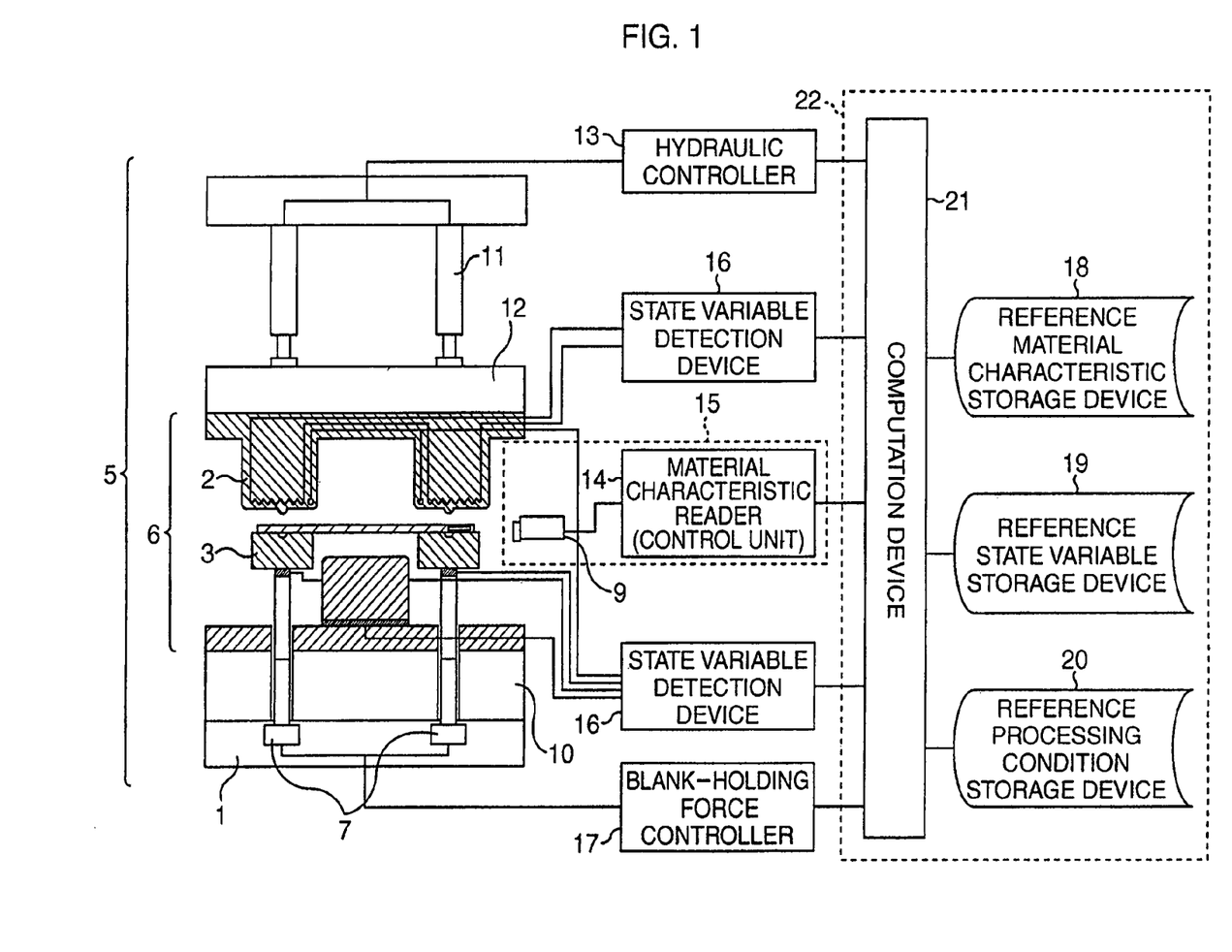
FIG. 1 is a structural and flow diagram of a press-forming device according to an exemplary embodiment of the present invention.

For example, FIG. 1 shows a structural and flow diagram of a press-forming device 5 of an exemplary embodiment of the present invention. This exemplary press-forming device 5 includes a punch 1, a die 2, a blank holder 3 and a metal mold device 6. One or more state variable sensors (load cell) 7 and a state variable sensor (a thermocouple) are also provided.

The punch 1 may be associated with an air cylinder 10, and a hydraulic cylinder 11 and a heater 12 can be included in the press-forming device 5.

A material characteristic reader 15 can be provided which includes a material characteristic reader (IC tag reader) 9 and a material characteristic reader (controller) 14. The press-forming device 5 may further include denotes a hydraulic controller 13, a state variable detection device 16, and a blank holding force controller 17. A control computer arrangement 22 can be provided to cooperate with the press-forming device 5. The computer arrangement 22 may include a standard material characteristic storage device 18, a reference state variable storage device 19, a standard processing condition storage device 20, and an arithmetic arrangement 21. The control computer arrangement 22 according to an exemplary embodiment of the present embodiment can include a computer system with, e.g., a central processing unit (CPU), a random access memory (RAM) and a read-only memory (ROM), along with a processing condition controller, a material characteristic input arrangement (e.g., hardware or program/software arrangement), a state variable detector (e.g., hardware or program/software arrangement), a processing condition computer arrangement (e.g., hardware or program/software arrangement), a material characteristic measurement arrangement (e.g., hardware or program/software arrangement), etc. For example, these exemplary hardware or program/software arrangements may be accessed by the control computer arrangement 22 or another computing arrangement to program such arrangements to execute specific procedures effectuated by these or program/software arrangements.

Figure 2:
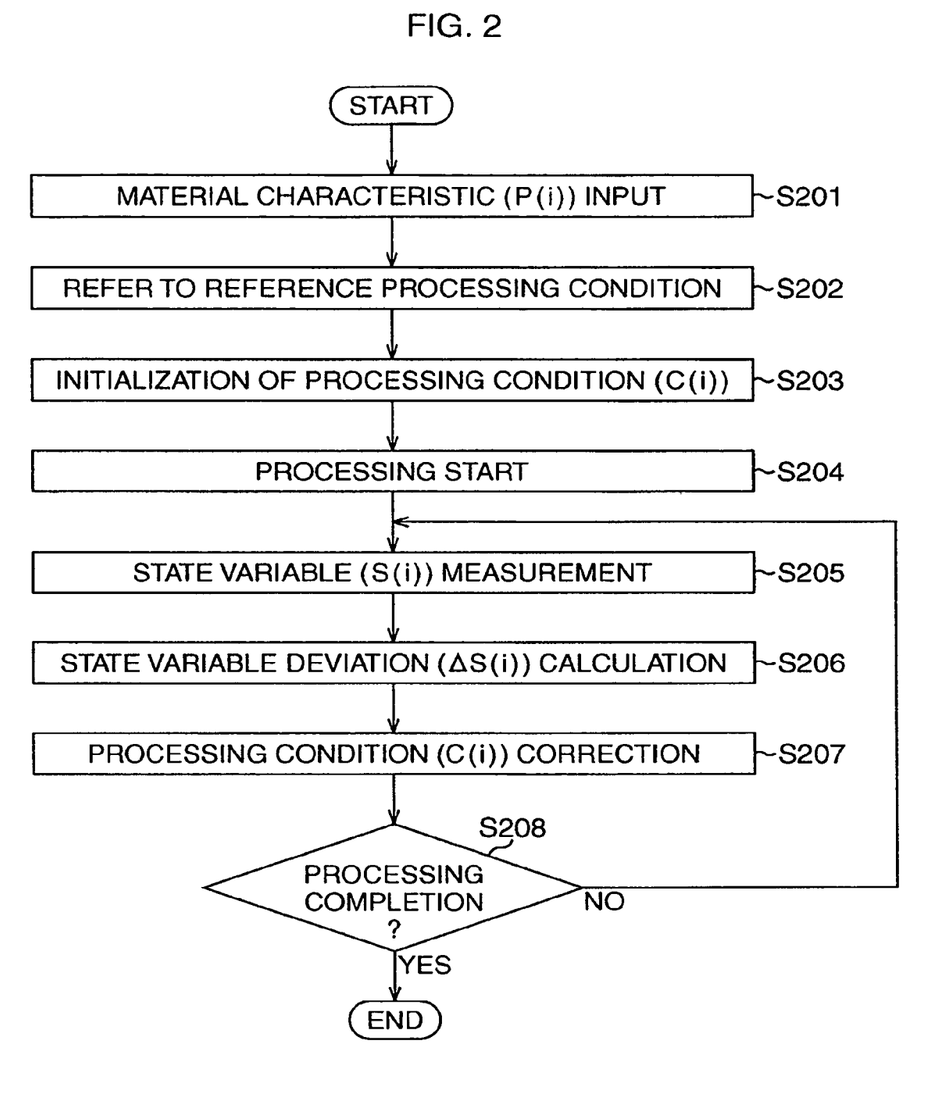
FIG. 2 is a flow chart of a press-forming procedure according to an exemplary embodiment of the present invention.

A procedure of a press-forming method according to the exemplary embodiment of the present invention is described below with reference to FIG. 2. Information regarding the metal material is read or obtained by the above-described material characteristic reader 15 from an IC tag 101, 111 (show in FIGS. 10 and 11, respectively) or a bar code 121 (shown in FIG. 12) pasted on the surface of the metal material at a stage of being set to the press-forming device 5. The material characteristic information thus read or obtained is provided by the material characteristic input arrangement (step S201). For example, the material characteristic may be one type or a combination of two or more types of the following exemplary characteristics: sheet thickness, yield strength, 0.2% proof stress, tensile strength, elongation, n value, r value, coefficient of stress-strain relation equation, table showing each point value approximated to the stress-strain relation with a line graph, hardness, temperature, surface roughness, friction coefficient, and lubricant film thickness, etc. for every material.

Figure 10:
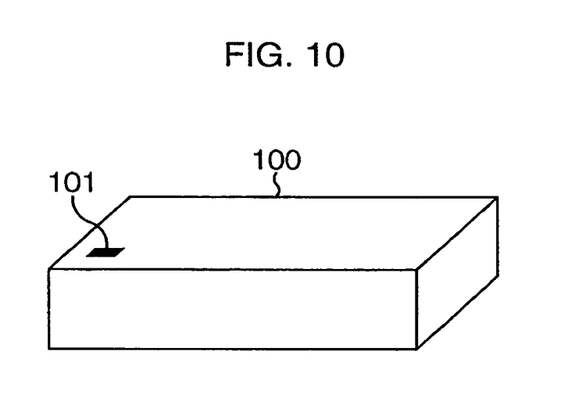
FIG. 10 is an elevation view of an IC tag provided for attaching to a cut plate package according to the exemplary embodiment of the present invention.
Figure 11:
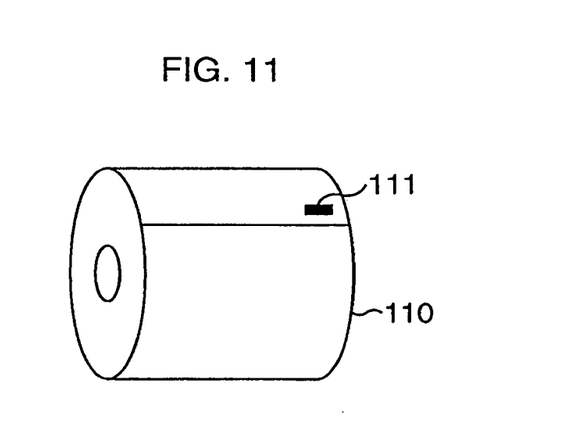
FIG. 11 is an elevation view of an IC tag provided for attaching to a material coil according to the exemplary embodiment of the present invention.
Figure 12:
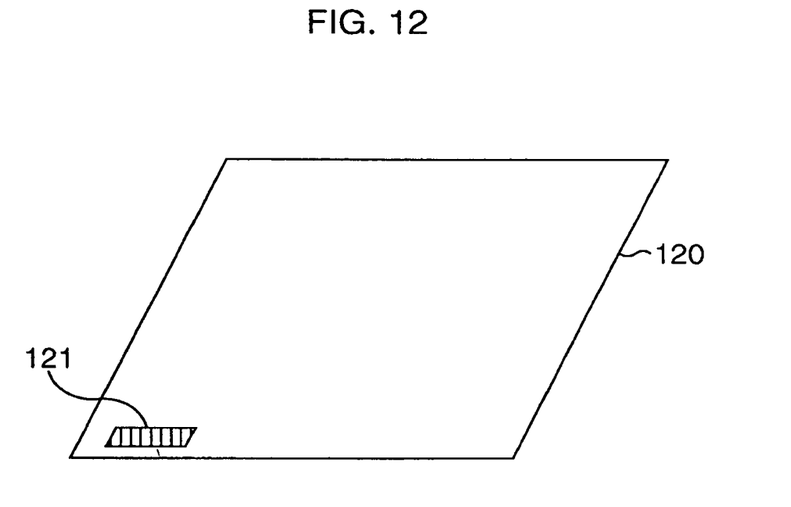
FIG. 12 is an elevation view of a bar code provided for attaching to a cut plate material according to the exemplary embodiment of the present invention.

As one exemplary way to input or provide material characteristics, the material characteristics can be directly read for every material from the bar code 121 or the IC tag 101, 111. When the amount of data is large, it is also possible to read an ID (identification) number from the bar code 121 or the IC tag 101, 111, and receive or obtain the real valued data corresponding to the identification number from, e.g., a server via a network and/or to this number input directly from a mill sheet, a flexible disc, etc. attached from a material manufacturer for every coil material into the material characteristic input device.

In general, when performing the exemplary press processing procedure, since the material is cut in an appropriate size from, for example, a coiled material before the material can be set in a press machine, and heat treatment or surface treatment is provided in certain exemplary cases, it may be difficult to obtain the above-described material characteristic in advance.

For this issue, it is possible to obtain further precise material characteristic information by directly measuring one kind or combination of two or more kinds among the above-described material characteristics, or preferably, from easiness of measurement, one type or a combination of two or more types out of sheet thickness, hardness, temperature, friction coefficient, and lubricant film thickness, before the material is set to the press-forming device 5 and/or at the time of setting.

Then, initialization values of processing condition can be corrected (steps S202, S203) based on the obtained material characteristic values and the reference material characteristic values to the material recorded or stored in the reference material characteristic storage device 18 (or another data recording device) in advance. The processing condition can be one type or a combination of two or more types of forming speed, blank holding force, and metal mold temperature.

An exemplary embodiment of a correction method of a processing condition according to the present invention is described below. For example, material characteristic values to the respective material characteristics can be taken respectively as P(j) (j=1–M, where M is the number of the material characteristic values), and the reference values for the respective material characteristics may be taken as P0 (j) (j=1–M). The initialization values to the above-described respective standard processing conditions can be taken respectively as C0(i) (i=1–L, where L is the number of processing condition set values). An influence function matrix which indicates the relation between the deviation of the material characteristic of a material from its reference value and the amount of correction of the processing condition may be taken as T1 (I, j), and the initialization value of the processing condition can be corrected with the following equation:

$$C0(i)(\text{after correction}) = C0(i)(\text{initialization value})*(1+ \Sigma(T1(ij)*(P(j)/P0(j)-1)))$$

$$(i=1-L, j=1-M) \quad (1)$$

Figure 3:
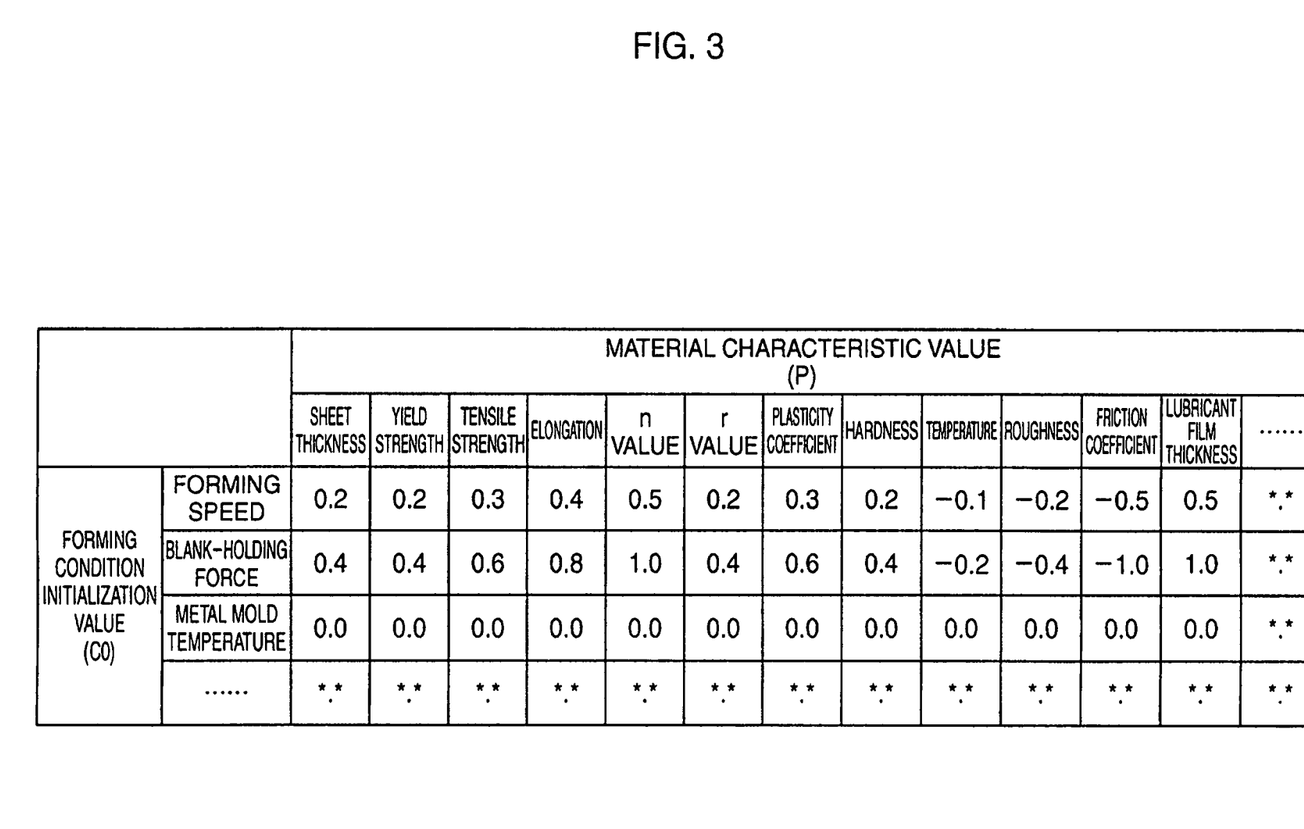
FIG. 3 is an exemplary table providing an influence function matrix relating to material characteristics and standard processing conditions according to the exemplary embodiment of the present invention.

The setting value C0(j) of the standard processing condition may be a fixed value during forming, and when it is changed during forming, for instance, a setting value to each punch stroke amount may be given. A formation example of the influence function matrix T1 is shown in an exemplary table of FIG. 3. When the sheet thickness is, for example, thicker than the reference value by 1%, the function of T1 can correspond to that the forming speed and blank holding force are increased by 0.2% and 0.4% respectively, and there may be no change for the metal mold temperature, using the equation (1).

Each component of the influence function matrix can be determined from the following exemplary methods: a method to determine from the change (sensibility analysis) of the optimum forming condition to the change of various material characteristics using a forming simulation by a finite element method; a method to statistically determine from a relation between material characteristic variation and processing condition, product quality (cracks, creases, spring back, surface distortion, and the like) in actual mass production press process; a method to input actual measurement value on product quality into the press-forming device as instruction data and prepare and update using, for instance, a learning function by a neural network; or the like. The formation of material characteristic value and processing condition or formulation method is not limited to the above described procedures and descriptions, and arbitrary setting is also adoptable.

Then, based on initial processing conditions, using the blank holding force controller, a forming speed controller, and a metal mold temperature controller, a load is applied on the blank holder, an upper metal mold may be descended and the forming procedure can be started (step S204). The controllers are not limited to those described above, other controlling arrangements, either single or a combination of multiple arrangement, in any arbitrary form may be used.

During the processing procedure, using the state variable detection device 16, at least one state variable out of punch reaction, metal mold temperature, metal mold distortion amount, work piece deformation amount, work piece temperature, etc. may be measured, and the processing condition can be corrected from one moment to another moment by the processing condition computer (see steps S205-S208).

In particular, the processing conditions can be corrected according to the following exemplary equation:

$$C(i)=C0(i)*(1+\Sigma(T2(i,k)*(S(k)/S0(k)-1))), (i=1-L, k=1-N) \quad (2)$$

where the state variable is S(k) (k=1–N; where N is the number of the state variable), the reference state variable stored in the reference state variable storage device is S0(k) (k=1–N), correction values for the respective processing conditions are C(i) (i=1–L), the influence function matrix indicating a relation between deviation of measured each state variable to its reference value and correction amount of the processing condition is T2(i, k) (i=1–L, k=1–N).

Figure 4:
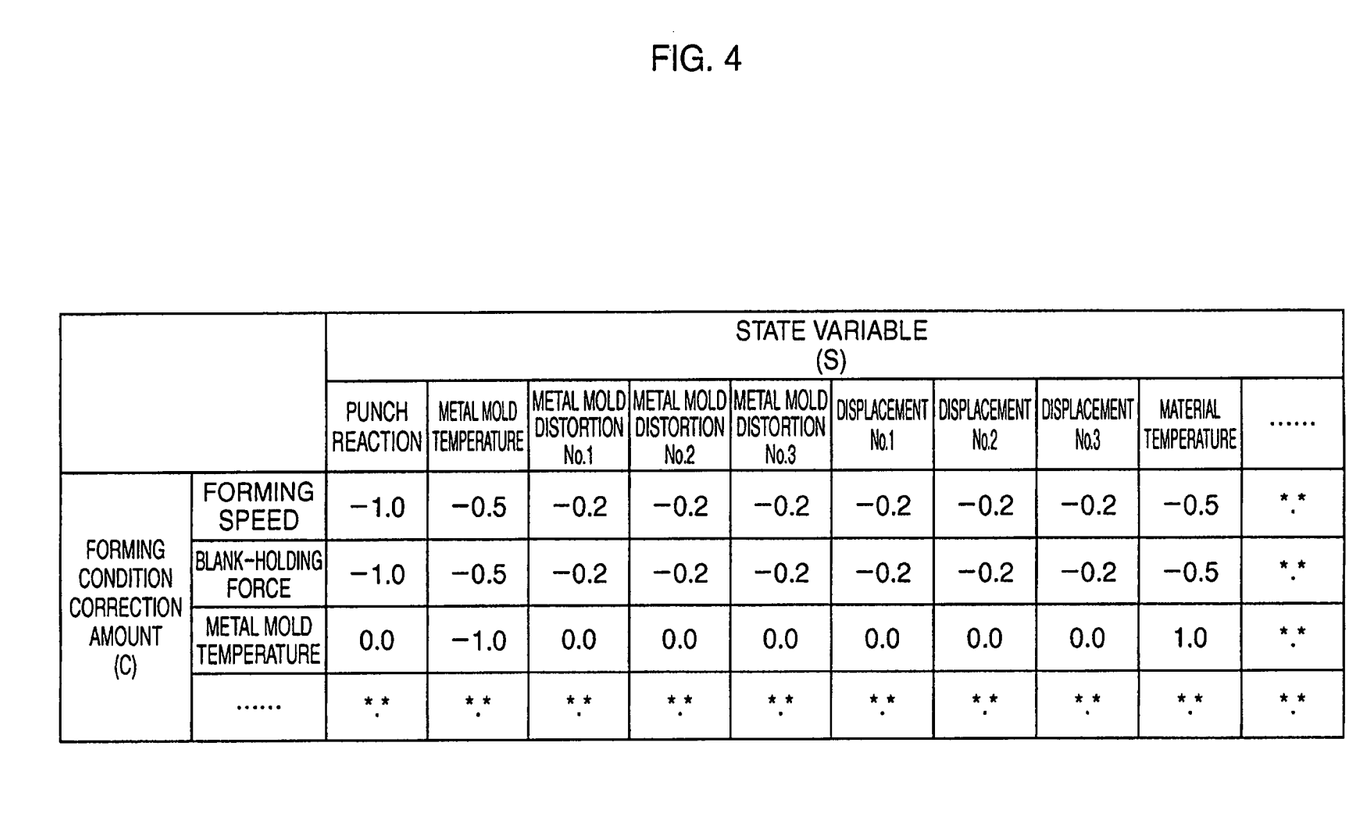
FIG. 4 is an exemplary table providing an influence function matrix relating to state variables and corrected processing conditions according to the exemplary embodiment of the present invention.

A formation example of the influence function matrix T2 is shown in an exemplary table of FIG. 4. When the punch reaction is, for example, higher than the reference value by about 1%, the function of the influence function matrix T2 corresponds to that, using the above-described equation (2), the forming speed and blank holding force may be decreased by about 1% and 0.5%, respectively, and there may be little or no change for the metal mold temperature. Each component of the influence function matrix T2 can be determined from a method to determine from the change (e.g., a sensibility analysis) of the optimum forming condition to the change of various material characteristics using a forming simulation by a finite element method, similarly to the above-described influence function matrix T1.

Further, it is possible to utilize an exemplary method to statistically determine from a relation between state variable variation and processing condition, product quality (crack, creases, spring back, surface distortion, and the like) in actual mass production press process, a method to input actual measurement value on product quality into the press-forming device as instruction data and prepare and update using, for example, a learning function by a neural network, or the like. The formation of the state variable or formulation method is not limited to the above described procedures/method, and arbitrary setting(s) may also be adopted.

An exemplary embodiment of a method to correct the forming conditions based on certain information that is based on the material characteristic inputted in advance, the material characteristic measured immediately before the press-forming, and the state variable during forming is described below. It may be preferable to correct the forming conditions based on not only one piece of information out of three pieces of the above-described information. Indeed, it may be preferable to make such correction based on two or more pieces of information to perform a reliable control.

It is difficult or even impossible to avoid an influence of disturbance which may be difficult to predict in advance, such as a lubrication condition during forming or the like with only one piece of information of material characteristic inputted in advance or material characteristic measured just before press-forming. Furthermore, it may be problematic that it is difficult or even impossible to separate influence due to material characteristic deviations with only the state variable during forming. This may be because the reduction effect of material characteristic deviations or product quality deviations caused by disturbance during forming may not be obtained satisfactorily.

Another Exemplary Embodiment

According to another exemplary embodiment of the present invention, the press-forming device 5 shown in FIG. 1 can be prepared and the press-forming procedure may be performed using a thin steel plate. As for the material characteristics, the sheet thickness and hardness may be measured for every blank, and typical mechanical properties attached by a material manufacturer for every coil are used for yield strength or 0.2% proof stress, tensile strength, and total elongation and inputted into a material characteristic input arrangement for every blank, respectively. As for the state variable provided during the forming, a punch reaction can be monitored using a load cell, the metal mold temperature can be monitored using a thermocouple and the forming speed, blank holding force are controlled based on the equations (1) and (2).

In the above-described exemplary procedure, a number of (e.g., 4) points of sheet thickness, yield strength, 0.2% proof stress, tensile strength, total elongation, and hardness can be used as the material characteristic value P(j) (j=1-5), two points of forming speed, and blank holding force may be used as the processing condition C(i) (i=1-2), and N points of punch reaction (N−1 point) for every punch stroke and metal mold temperature are used as the state variable S(k) (k=1−N).

Figure 5:
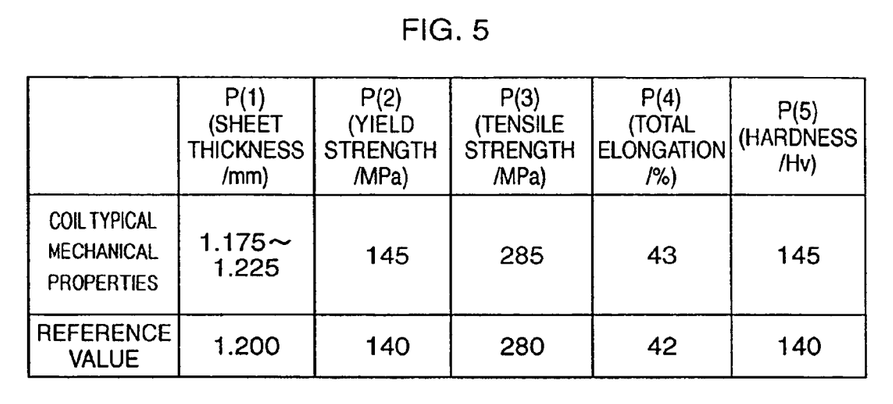
FIG. 5 is an exemplary table providing reference values of material characteristics according to the exemplary embodiment of the present invention.

As for a raw material utilized for the exemplary procedure, a "150 mm" blank stamped from the same cold rolling coil for deep drawing having an average thickness of 1.2 mm and a width of 1000 mm may be used to perform "50 mm" square cup drawing with a forming height of "40 mm". Exemplary mechanical properties and reference values of the coil are provided in the table shown in FIG. 5.

Figure 6:
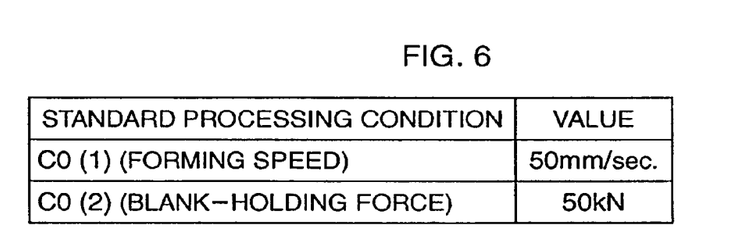
FIG. 6 is an exemplary table providing an example of standard processing conditions according to the exemplary embodiment of the present invention.
Figure 7:
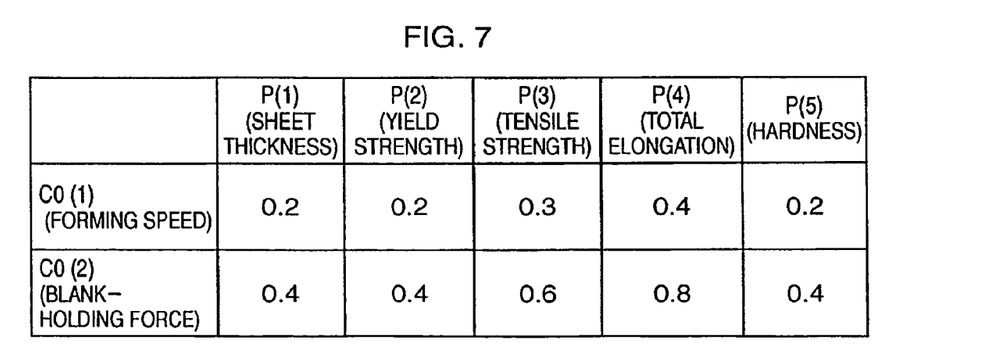
FIG. 7 is an exemplary table providing another example of an influence function matrix relating to material characteristics and standard processing conditions according to the exemplary embodiment of the present invention.

Exemplary or standard processing conditions for the exemplary characteristics of this material are provided in the table shown in FIG. 6. Based on the actual measurement value for the sheet thickness and the typical mechanical properties of the coil inputted for every sheet of the blank, an initialization of the processing conditions can be performed using the influence function matrix T1 provided above in equation (1) and provided in the table shown in FIG. 7, and the forming procedure is initiated.

During the processing procedure, the forming procedure is performed without changing the initialization during a first exemplary procedure for the previously-described exemplary embodiment of the present invention. For example, the forming conditions are set based on the material characteristics inputted in advance and the material characteristics measured before forming, and the forming is performed without using a state variable during forming, and the forming speed and blank holding force set to be about constant.

Figure 8:
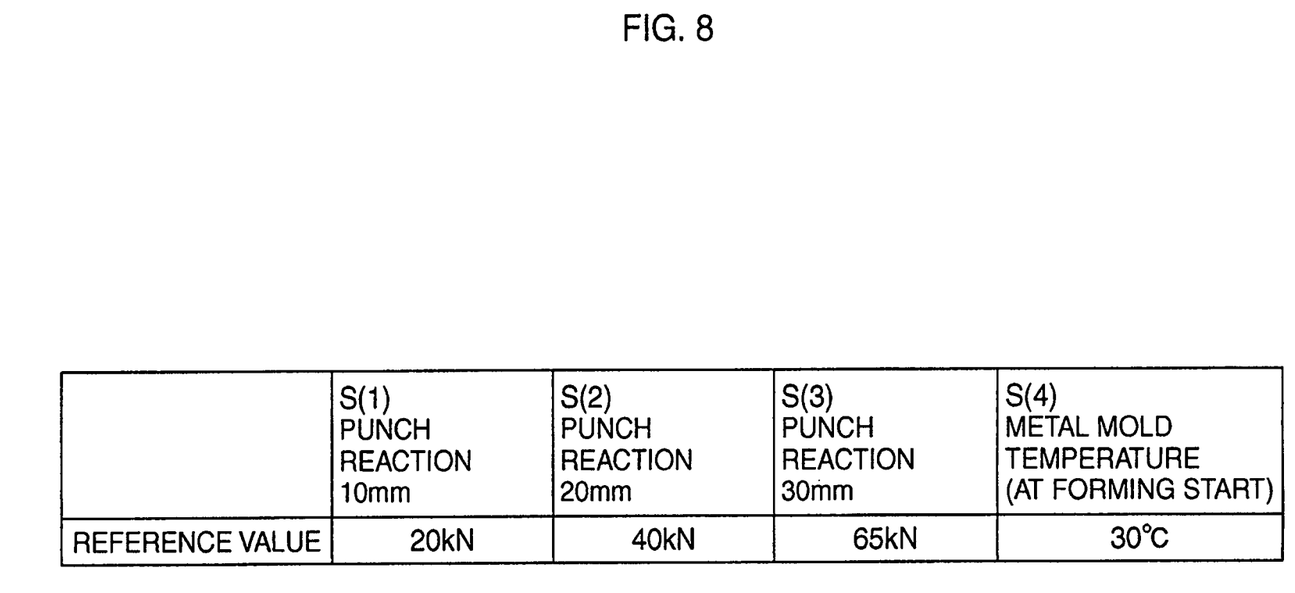
FIG. 8 is an exemplary table providing an example of reference values of state variables according to the exemplary embodiment of the present invention.
Figure 9:
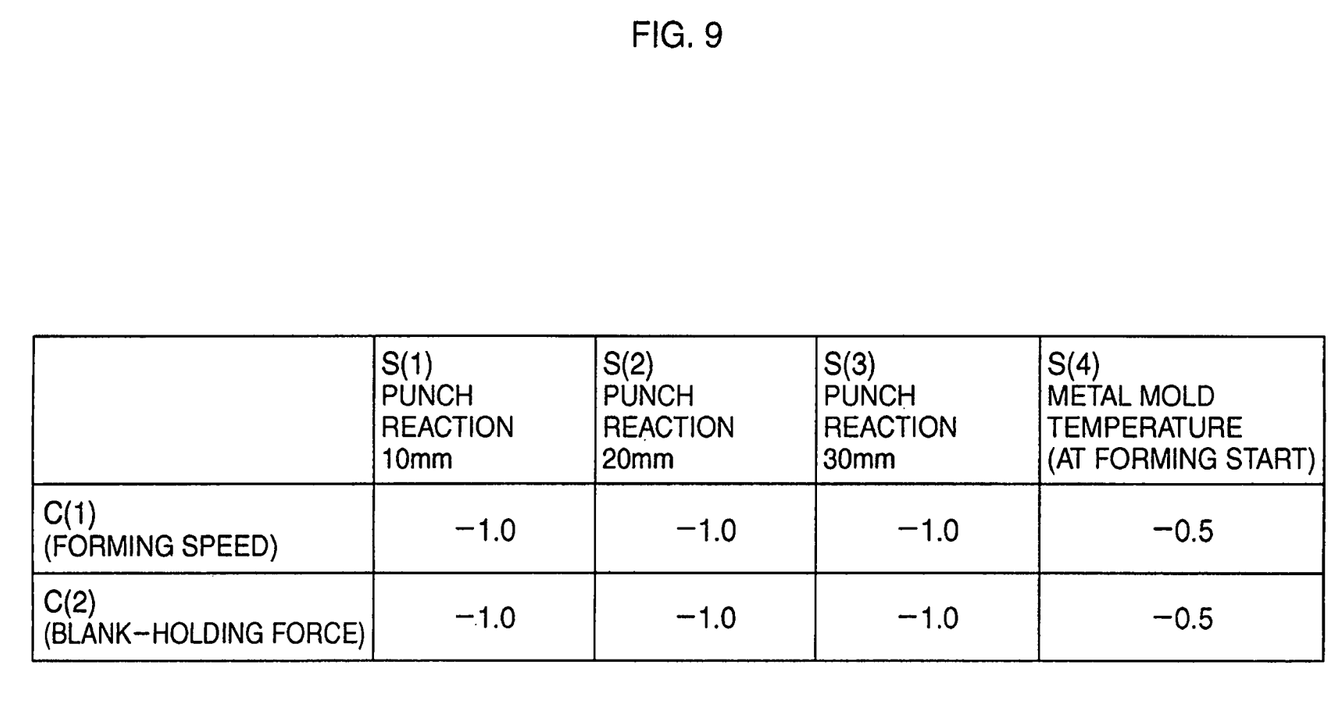
FIG. 9 is an exemplary table providing another example of an influence function matrix relating to state variables and corrected processing conditions according to the exemplary embodiment of the present invention.

According to a second exemplary procedure of the present invention, the punch reaction and the metal mold temperature may be measured for about every 10 mm stroke until the maximum punch stroke (=forming height 40 mm). The punch reaction and the metal temperature may be obtained at the time of obtaining an acceptable product under approximately the same processing conditions by a trial pressing in advance as reference values of the state variable provided in the table shown in FIG. 8, using the influence function T2 provided in the table shown in FIG. 9, forming speed and blank holding force are adjusted with equation (2). Indeed, the press conditions can be controlled using the material characteristics inputted in advance, the material characteristics measured before the forming, and the state variable during the forming.

According to a third exemplary procedure of the present invention, a measured value of only sheet thickness and hardness for every one blank sheet can be used, without using material characteristics such as yield strength or 0.2% proof stress, tensile strength, and total elongation. In this manner, the punch reaction and the metal mold temperature can be measured using such measured value for approximately every 10 mm stroke until the maximum punch stroke (e.g., a forming height 40 mm) similarly to the manner in the second exemplary procedure, taking the punch reaction and the metal temperature at the time of obtaining an acceptable product under approximately the same processing conditions by a trial pressing in advance as reference values of the state variable provided in the table shown in FIG. 8, using the influence function T2 provided in the table shown in FIG. 9, forming speed and blank holding force are adjusted with equation (2). In particular, the press conditions can be controlled using the material characteristics measured before forming, and the state variable during forming.

According to a fourth exemplary procedure of the present invention, using the material characteristics inputted in advance, such as yield strength or 0.2% proof stress, tensile strength, and total elongation, similarly to the second exemplary procedure, the punch reaction and the metal mold temperature may be measured for every 10 mm stroke. Such measurement can be performed until the maximum punch stroke (for example, having a forming height of about 40 mm), taking the punch reaction and the metal temperature at the time of obtaining a good product under the same processing conditions by a trial pressing in advance as reference values of the state variable provided in the table shown in FIG. 8, using the influence function T2 provided in the table shown in FIG. 9, the forming speed and blank holding force are adjusted with the equation (2). In other words, the press conditions can be controlled using the material characteristics inputted in advance, and the state variable during the forming.

As a comparison example, using the forming speed and blank holding force without changing the processing conditions to the reference material characteristics, the forming procedure is performed without correcting the reference processing conditions during the forming.

For example, the above-described forming experiment can be carried out by punching total of about 1000 pieces of blanks from the same coil, the defective pieces due to the occurrence of cracks and creases can be compared as follows.

sheet thickness standard deviation: 5 um
percent detective:
(First exemplary procedure of the present invention) 0.9%
(Second exemplary procedure of the present invention) 0.1%
(Third exemplary procedure of the present invention) 0.5%
(Fourth exemplary procedure of the present invention) 0.5%
(Comparative Example) 1.2%

The percentage of the defective pieces can be reduced by changing the initialization of the processing conditions according to the deviation of the sheet thickness, and the percent defective is further reduced by adjusting the processing condition according to punch reaction and metal mold temperature during the forming.

FIG. 10 shows an elevation view of an exemplary cut plate package 100 supplied from a coil processing center, to which the IC tag 101 is attached. Information such as "tensile strength", "yield strength or 0.2% proof stress", "total elongation", "sheet thickness", "production date" and the like can be stored in the IC tag 101. The information is read or obtained using the material characteristic reader (IC tag reader) 9, and may be transmitted to the computation device 21, thereby reducing or eliminating the labor that would otherwise be incurred if the data were inputted manually.

FIG. 11 shows an elevation view of an exemplary material coil 110 which includes attached thereto the IC tag 111. In this exemplary embodiment, information such as "tensile strength", "yield strength or 0.2% proof stress", "total elongation", "sheet thickness", "production date" and the like may be stored in the IC tag 111. Therefore, it may be possible to reduce the labor to manually input the material characteristics when the material coil 110 is pressed and the information obtained in an automated matter.

FIG. 12 shows an elevation view of an exemplary embodiment of a cut plate material 120 to which the bar code 121 is attached. Information showing a product lot number can be displayed on the bar code 121. By reading the information with a bar code reader in the material characteristics reader, information relating to the corresponding material can be obtained from, for example, a server computer on a network.

Figure 13:
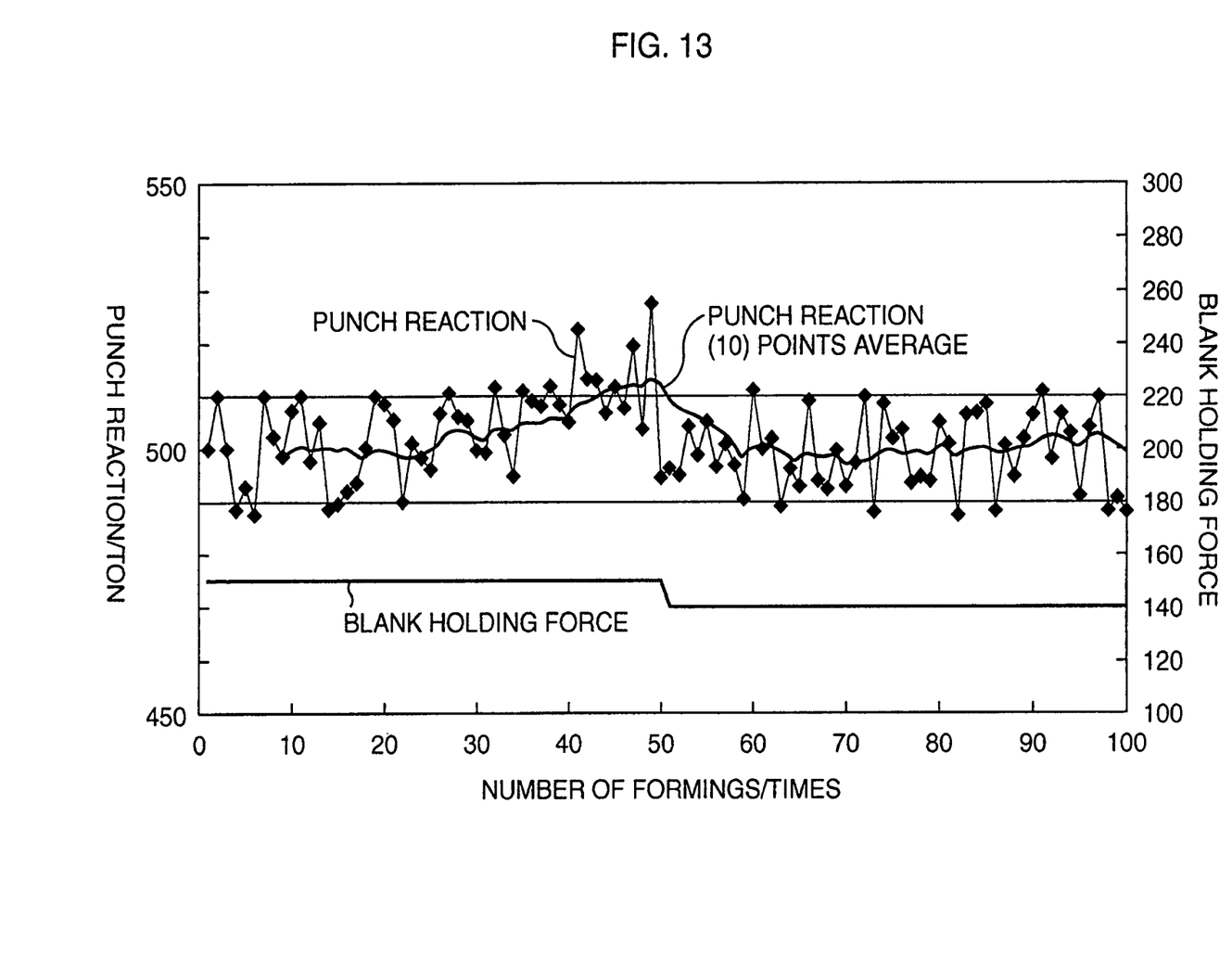
FIG. 13 is a graph showing an exemplary relationship between punch reaction and blank holding force according to the exemplary embodiment of the present invention.

Further, another exemplary embodiment for performing the exemplary press-forming procedure is described below with reference to FIG. 13. In FIG. 13, a graph in which punch reactions and blank holding forces are expressed along the vertical axis, and the number of forming times are expressed along the horizontal axis. A black rhombus in FIG. 13 denotes a punch reaction during the time of forming.

In this exemplary embodiment, the punch reaction maximum value during the forming can be captured and stored in a storage arrangement that can be accessed by a computer for every time of the forming. Further, the moving average of the punch reaction maximum values can be determined, and an example of controlling to change the blank holding force when the punch reaction maximum value exceeds a prescribed value (in an example in FIG. 13, 500 ton±10 ton) may be shown.

As a result, as shown in the exemplary illustration of FIG. 13, since the 10 points moving average value exceeds a permissible range, the forming can be carried out under reduced blank holding force from, e.g., fiftieth times. As a result, the punch reaction maximum value can be maintained within the prescribed value, forming of predetermined number of sheets can be achieved without the occurrence of a defective piece.

In the above explanation, an example in which the punch reaction maximum value during processing is taken in a computer for every one time of forming is shown, and it may be taken in for every prescribed time. Furthermore, in the exemplary graph shown in FIG. 13, an example in which the blank holding force is reduced from the fiftieth times because the 10 point moving average exceeds a permissible range is shown. However, the blank holding force may be increased when the moving average value falls short of the permissible range.

In the above explanation, the blank holding force can be adjusted using the history of the punch reaction maximum values. However, exemplary embodiments of the present invention are not limited to such exemplary adjustments, and it is also possible to adjust other processing condition, for instance, the forming speed or the like using the history of other state variables for instance, the metal mold temperature, the metal mold distortion amount, etc.

Further Exemplary Embodiments

As described above, the control computer arrangement 22 can include a computer CPU or mathematic processing unit (MPU), RAM, ROM, and the like, and the exemplary embodiment of the press-forming method according to the present embodiment can be employed, e.g., by operating a computer program/software arrangement stored in the above-described RAM, ROM, or other storage arrangements.

Accordingly, the computer program/storage arrangement, when executed by the computer arrangement 22 or another processing arrangement, can cause the performance of the exemplary functions of the exemplary embodiment of the present invention. To transmit the computer program/software arrangement, it is possible to use a communication medium (e.g., wire circuit such as optical fiber or wireless arrangement or the like) in a computer network system (e.g., local area network—LAN, wide area network—WAN—such as the Internet, wireless communication network or the like).

Further, the above-described computer program/software arrangement can be provided to a computer, for example, via a storage medium that is configured to store such computer program/software arrangement. Such storage medium can include a flexible disc, hard disc, optical disc, magneto-optic disc, CD-ROM, magnetic tape, nonvolatile memory card, ROM, etc.

INDUSTRIAL APPLICABILITY

According to the exemplary embodiments of the present invention, it is possible to obtain certain processing conditions to avoid an influence due to unpredictable deviation factors such as variation in material characteristics, environmental change, lubricity between a metal mold and work, surface property, etc., and it is possible to obtain a favorable product.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements, computer programs, procedures and methods which, although not explicitly shown or described herein, embody the principles of the invention and are thus within the spirit and scope of the present invention. In addition, to the extent that the prior art knowledge has not been explicitly incorporated by reference herein above, it is explicitly incorporated herein in its entirety. All publications referenced herein above are incorporated herein by reference in their entireties.

What is claimed is:

1. A non-transitory computer-readable medium having instructions stored thereon, such that when the instructions are read and executed by a processor, the processor is configured to perform the steps of:
  causing at least one of:
    providing at least one first characteristic from material characteristics comprising a thickness of the at least one portion of the material, a yield strength of the at least one portion of the material, about 0.2% proof stress, a tensile strength of the at least one portion of the material, an elongation of the at least one portion of the material, n value of the at least one portion of the material, r value of the at least one portion of the material, a stress-strain relation equation for the at least one portion of the material, a hardness of the at least one portion of the material, temperature, a surface roughness of the at least one portion of the material, a friction coefficient of the at least one portion of the material or a lubricant film thickness of the at least one portion of the material, or measuring at least one second characteristic of the material characteristics before the at least one portion of the material is form;

measuring a state variable comprising a metal mold distortion amount, or the state variable and at least one of state variables comprising a punch reaction, a metal mold temperature, a work piece deformation amount or a work piece temperature during the formation of the at least one portion of the material;

determining from a first moment to a second moment of at least one particular processing condition from at least one of a forming speed of the at least one portion of the material, a blank holding force or a metal mold temperature as a function of at least two of the at least one first characteristic, the at least one second characteristic or the at least one of the state variables, wherein said determining is performed using (i) a first influence function matrix for indicating a relation between a material characteristic of the material and a correction amount of the at least one particular processing condition, and (ii) a second influence function matrix for indicating a relation between a state variable and the correction amount of the at least one particular processing condition; and controlling
the at least one processing condition from processing conditions comprising at least one of a punch movement speed, a die movement speed, a metal mold temperature or a blank holding force based on the at least one processing condition, correcting an initialization value C0(i) of the at least one processing condition using:

$$C0(i)(\text{after correction}) = C0(i)(\text{initialization value}) * (1 + \Sigma(T1(i,j)*(P(j)/P0(j)-1)))$$

$(i=1-L, j=1-M)$, where T1(i,j) is an influence function matrix which indicates a relation between a deviation of the material characteristic of a material from a reference value thereof and an amount of correction of the at least one processing condition, where P(j) are material characteristic values, where P0(j) are reference values for respective material characteristics, where L is a number of processing condition set values, and where M is a number of the material characteristic values, and correcting (iii) correct the at least one processing condition using:

$$C(i) = C0(i)*(1 + \Sigma(T2(i,k)*(S(k)/S0(k)-1))), (i=1-L, k=1-N),$$

where C(i) (i=1-L) are correction values for respective processing conditions, where T2(i,k) (i=1-L, k=1-N) is an influence function matrix which indicates a relation between a deviation of a measured state variable to a reference value and a correction amount of the at least one processing condition, where S(k) (k=1-N) is the state variable, where S0(k) (k=1-N) is a reference state variable, and where N is a number of the state variable.

2. A method comprising:

controlling the at least one processing condition from processing conditions comprising at least one of a punch movement speed, a die movement speed, a metal mold temperature or a blank holding force based on the at least one processing condition;

correcting an initialization value C0(i) of the at least one processing condition using:

$$C0(i)(\text{after correction}) = C0(i)(\text{initialization value})*(1 + \Sigma(T1(i,j)*(P(j)/P0(j)-1)))$$

$(i=1-L, j=1-M)$, where T1(i,j) is an influence function matrix which indicates a relation between a deviation of the material characteristic of a material from a reference value thereof and an amount of correction of the at least one processing condition, where P(j) are material characteristic values, where P0(j) are reference values for respective material characteristics, where L is a number of processing condition set values, and where M is a number of the material characteristic values; and correcting the at least one processing condition using:

$$C(i) = C0(i)*(1 + \Sigma(T2(i,k)*(S(k)/S0(k)-1))), (i=1-L, k=1-N),$$

where C(i) (i=1-L) are correction values for respective processing conditions, where T2(i,k) (i=1-L, k=1-N) is an influence function matrix which indicates a relation between a deviation of a measured state variable to a reference value and a correction amount of the at least one processing condition, where S(k) (k=1-N) is the state variable, where S0(k) (k=1-N) is a reference state variable, and where N is a number of the state variable.

3. A non-transitory computer-readable medium having instructions stored thereon, said instructions are read and executed by a processor for causing the processor to perform the method according to claim 2.

* * * * *